United States Patent
Yang et al.

(10) Patent No.: US 12,502,412 B2
(45) Date of Patent: Dec. 23, 2025

(54) *Lactobacillus fermentum* STRAIN, AND COMPOSITION FOR PREVENTING OR TREATING METABOLIC DISEASES, COMPRISING SAME (71) Applicant: GI BIOME, Seongnam-si (KR)

(72) Inventors: Bo Gie Yang, Seoul (KR); Myung Ho Jang, Seoul (KR); Chang Ho Kang, Chungju-si (KR); Nam Soo Paek, Seoul (KR)

(73) Assignee: GI Biome, Seongnam-si (KR)

( * ) Notice: Subject to any disclaimer, the term of this patent is extended or adjusted under 35 U.S.C. 154(b) by 586 days.

(21) Appl. No.: 17/758,212

(22) PCT Filed: Dec. 29, 2020

(86) PCT No.: PCT/KR2020/019346
§ 371 (c)(1),
(2) Date: Jun. 29, 2022

(87) PCT Pub. No.: WO2021/137602
PCT Pub. Date: Jul. 8, 2021

(65) Prior Publication Data
US 2023/0038910 A1   Feb. 9, 2023

(30) Foreign Application Priority Data
Dec. 31, 2019 (KR) .................. 10-2019-0178950

(51) Int. Cl.
| | |
|---|---|
| *A61K 35/747* | (2015.01) |
| *A23K 10/18* | (2016.01) |
| *A23L 33/135* | (2016.01) |
| *A61P 3/04* | (2006.01) |
| *A61P 3/10* | (2006.01) |
| *C12N 1/20* | (2006.01) |
| *C12R 1/225* | (2006.01) |

(52) U.S. Cl.
CPC ............ *A61K 35/747* (2013.01); *A23K 10/18* (2016.05); *A23L 33/135* (2016.08); *A61P 3/04* (2018.01); *A61P 3/10* (2018.01); *C12N 1/205* (2021.05); *A23V 2002/00* (2013.01); *A23V 2400/143* (2023.08); *C12R 2001/225* (2021.05)

(58) Field of Classification Search
CPC ...... A61K 35/747; A23K 10/18; A23K 10/16; A23L 33/135; A61P 3/04; A61P 3/10; A61P 3/00; C12N 1/205; C12N 1/20; A23V 2002/00; A23V 2400/143; C12R 2001/225
See application file for complete search history.

(56) References Cited

U.S. PATENT DOCUMENTS

| | | |
|---|---|---|
| 2004/0071680 A1 | 4/2004 | Song et al. |
| 2011/0081320 A1 | 4/2011 | Westall et al. |
| 2012/0183504 A1 | 7/2012 | Lu et al. |
| 2013/0336942 A1 | 12/2013 | Leser et al. |
| 2015/0343003 A1 | 12/2015 | Kullisaar et al. |
| 2020/0069748 A1 | 3/2020 | Paek et al. |
| 2021/0115392 A1 | 4/2021 | Park |
| 2024/0293484 A1 | 9/2024 | Jang et al. |

FOREIGN PATENT DOCUMENTS

| | | |
|---|---|---|
| CN | 108085285 A | 5/2018 |
| CN | 110218681 A | 9/2019 |
| CN | 111793577 A | 10/2020 |
| JP | 2004250338 A | 9/2004 |
| JP | 2011121923 A | 6/2011 |
| JP | 2015168614 A | 9/2015 |
| KR | 1020020072913 A | 9/2002 |
| KR | 20050010451 A | 1/2005 |
| KR | 10-0996577 B1 | 11/2010 |
| KR | 20120067683 A | 6/2012 |
| KR | 20130045511 A | 5/2013 |
| KR | 20130046896 A | 5/2013 |
| KR | 101287120 B1 | 7/2013 |
| KR | 10-1394348 B1 | 5/2014 |
| KR | 10-1494279 B1 | 4/2015 |
| KR | 1020150068061 A | 6/2015 |
| KR | 20160098149 A | 8/2016 |

(Continued)

OTHER PUBLICATIONS

Yadav et al., Probiotics and Antimicrobial Proteins (2019) 11:509-518; doi.org/10.1007/s12602-018-9429-4. Published on May 13, 2018. (Year: 2018).*
International Search Report, mailed Apr. 27, 2021, for International Patent Application No. PCT/KR2020/019346. (4 pages).
Tomaro-Duchesneau et al., "Effect of orally administered *L. fermentum* NCIMB 5221 on markers of metabolic syndrome: an in vivo analysis using ZDF rats," *Appl Microbiol Biotechnol* 98:115-126, 2014.
Balakumar et al., "Improvement in glucose tolerance and insulin sensitivity by probiotic strains of Indian gut origin in high-fat diet-fed C57BL/6J mice," *European Journal of Nutrition* 57:279-295, 2016.

(Continued)

*Primary Examiner* — Kade Ariani
(74) *Attorney, Agent, or Firm* — Seed IP Law Group LLP (57) ABSTRACT

Provided is a novel *Lactobacillus fermentum* strain (Accession No. KCTC 14106BP) and a composition for preventing or treating a metabolic disease including the same. A *Lactobacillus fermentum* according to the present invention may inhibit fat accumulation and increase anti-inflammatory cells in white adipose tissue. In addition, the *Lactobacillus fermentum* may effectively inhibit fat accumulation in brown adipose tissue and in liver tissue. The *Lactobacillus fermentum* strain may exhibit excellent blood glucose improvement effect, and in particular, may reduce a fasting blood glucose level. The *Lactobacillus fermentum* strain may effectively ameliorate insulin resistance by improving glucose tolerance and increasing insulin sensitivity. Therefore, the *Lactobacillus fermentum* strain may be usefully used to prevent or treat a metabolic disease such as obesity.

10 Claims, 11 Drawing Sheets

(56) References Cited

FOREIGN PATENT DOCUMENTS

| | | |
|---|---|---|
| KR | 10-2018-0011490 | 2/2018 |
| KR | 101981333 B1 | 5/2019 |
| KR | 20190051771 A | 5/2019 |
| KR | 20190051772 A | 5/2019 |
| KR | 101985792 B1 | 6/2019 |
| KR | 10-2021883 B1 | 9/2019 |
| KR | 102028744 B1 | 10/2019 |
| KR | 102038695 B1 | 10/2019 |
| WO | WO 2011052996 A2 | 5/2011 |
| WO | WO 2012074351 A1 | 6/2012 |
| WO | 2019190146 A2 | 10/2019 |

OTHER PUBLICATIONS

International Search Report, mailed Jun. 14, 2021, for International Patent Application No. PCT/KR2021/002389, 7 pages.
International Search Report, mailed Apr. 26, 2021, for International Patent Application No. PCT/KR2020/019344. (8 pages).
International Search Report, mailed Apr. 27, 2021, for International Patent Application No. PCT/KR2020/019347. (7 pages).
Kang et al., "Antibacterial Activity and Pro biotic Properties of Lactic Acid Bacteria Isolated from Traditional Fermented Foods," *Korean Society for Biotechnology and Bioengineering Journal* 32(3): 199-205, 2017 (with English Abstract).
Kim et al., "*Lactobacillus helveticus* suppresses experimental rheumatoid arthritis by reducing inflammatory T cell responses," *Journal of Functional Foods* 13:350-362, 2015.
Rong et al., "Probiotic and anti-inflammatory attributes of an isolate *Lactobacillus helveticus* NS8 from Mongolian fermented koumiss," *BMC Microbiology* 15: 196, 2015. (11 pages).
International Search Report, mailed Jul. 1, 2022, for International Patent Application No. PCT/KR2022/003890, with English translation. (5 pages).
Bhathena et al., "Effect of Orally Administered Microencapsulated FA—Producing L. fermentum on Markers of Metabolic Syndrome: An In Vivo Analysis," Journal of Diabetes & Metabolism S2:009, May 25, 2012. (10 pages).
Ahn et al., "Effect of dietary probiotics on colon length in an inflammatory bowel disease-induced murine model: A meta-analysis," *Journal of Dairy Science* 103(2), 2020 [Published Online Nov. 2019] (13 pages).
Extended European Search Report, mailed Jul. 18, 2023, for European Patent Application No. 21761000.5-1118. (11 pages).
Kawano et al., "*Lactobacillus helveticus* SBT2171 Induces A20 Expression via Toll-Like Receptor 2 Signaling and Inhibits the Lipopolysaccharide-Induced Activation of Nuclear Factor-kappa B and Mitogen-Activated Protein Kinases in Peritoneal Macrophages," *Frontiers in Immunology* 10:845, Apr. 2019. (13 pages).
Lee et al., "*Lactobacillus plantarum* Strain Ln4 Attenuates Diet-Induced Obesity, Insulin Resistance, and Changes in Hepatic mRNA Levels Associated with Glucose and Lipid Metabolism," *Nutrients* 10(643), May 19, 2018. (15 pages).
Rong et al., "Oral Intake of *Lactobacillus helveticus* NS8 Alleviates Ovalbumin-Induced Atopic Dermatitis in SKH-1 Hairless Mice," *Indian Journal of Microbiology* 58(3):312-318, 2018 [Published Online Apr. 2018] (7 pages).
Taverniti et al., "Health-Promoting Properties of *Lactobacillus helveticus*," *Frontiers in Microbiology* 3:392, Nov. 2012. (13 pages).
Ahmed et al., "Altered circulating concentrations of active glucagon-like peptide (GLP-1) and dipeptidyl peptidase 4 (DPP4) in obese subjects and their association with insulin resistance," Clinical Biochemistry 50:746-749, Mar. 11, 2017. (4 pages).
Batty et al., "Metabolic Hormones Modulate Macrophage Inflammatory Responses," Cancers 13:4661, Sep. 17, 2021. (28 pages).
Lean et al., "Altered gut and adipose tissue hormones in overweight and obese individuals: cause or consequence?," International Journal of Obesity 40:622-632, 2016 [Published online Dec. 1, 2015]. (11 pages).
Skurk et al., "Obesity and impaired fibrinolysis: role of adipose production of plasminogen activator inhibitor-1," International Journal of Obesity 28:1357-1364, Aug. 31, 2004. (10 pages).
Wronska et al., "Structural and biochemical characteristics of various white adipose tissue depots," Acta Physiologica 205:194-208, Jan. 7, 2012. (16 pages).
Xiang et al., "Supplementation of Fermented Barley Extracts with Lactobacillus Plantarum dy-1 Inhibits Obesity via a UCP1-dependent Mechanism," Biomedical and Environmental Sciences 32(8):578-591, Aug. 2019. (14 pages).

\* cited by examiner

Lactobacillus fermentum STRAIN, AND COMPOSITION FOR PREVENTING OR TREATING METABOLIC DISEASES, COMPRISING SAME

TECHNICAL FIELD

The present disclosure relates to a novel *Lactobacillus fermentum* strain and a composition for preventing or treating a metabolic disease including the same.

BACKGROUND ART

As society develops, obesity has emerged as one of the serious diseases, and the World Health Organization (WHO) has recognized obesity as a disease to be treated. Recently, the trend toward increasing prevalence of obesity is also observed in Republic of Korea due to westernized diet, and there is a growing interest in treatment and prevention therefor. Obesity refers to a state of an excessive accumulation of body fat resulting from an imbalance between food consumption and energy expenditure. In addition, obesity is closely related to insulin resistance, glucose tolerance, hyperlipidemia, etc., and may be accompanied by metabolic diseases including cardiovascular diseases, fatty liver diseases, cancers, and diabetes as complications.

Recently, as it became known that the inflammatory response in adipose tissue of an obese patient is increased, obesity is sometimes considered as a low-grade systemic inflammation. In particular, it has been reported that inflammatory response is increased by inflammatory macrophages that are increased in proportion to the size of adipose tissue, inflammatory adipokines produced and secreted by adipose tissue in such a state is a pathogenic factor of metabolic diseases such as cardiovascular diseases and diabetes. Therefore, obesity which increases these molecules may be seen as a cause of almost all adult diseases.

Currently prescribed obesity medicines are Xenical (Roche Pharmaceuticals., Switzerland), Reductil (Abbott Co., US) and Exolise (Arkopharma LLC, France), or the like. The obesity medicines are largely classified as appetite suppressants, energy expenditure promoters, or fat absorption inhibitors, and most of the obesity medicines are appetite suppressants that suppress appetite by controlling neurotransmitters related to hypothalamus. However, conventional obesity medicines have side effects such as heart diseases, respiratory diseases, and nervous system diseases, and also have a problem in that in vivo persistence thereof is low. Accordingly, there is a need to develop safe and effective obesity treatments.

Meanwhile, probiotics to prevent or treat obesity using safe microorganisms (e.g., lactic acid bacteria) has been actively studied. In particular, research has shown that lactic acid bacteria exhibit effects such as maintenance of normal intestinal flora, improvement of intestinal flora, antidiabetic and antilipidemic effects, inhibition of carcinogenesis, inhibition of colon cancer, and nonspecific activity of the host's immune system.

Regarding lactic acid bacteria related to obesity prevention and treatment effect, KR Patent No. 10-1494279 discloses a *Lactobacillus plantarum* KY1032 strain (Accession No. KCCM-10430) having an inhibitory effect on adipocyte differentiation, KR Patent No. 10-0996577 discloses a *Lactobacillus curvatus* HY7601 (Accession No. KCTC 11456BP) having obesity inhibitory effect, and KR Patent No. 10-1394348 discloses a *Lactobacillus plantarum* DSR920 strain (Accession No. KCCM 11210P) having an inhibitory effect on adipocyte differentiation, but none of them is mature enough to obtain commercial success.

Therefore, there is a need to continue research on a new strain having excellent anti-obesity effect.

DETAILED DESCRIPTION OF THE INVENTION

Technical Problem

Accordingly, the present inventors found out that a *Lactobacillus fermentum* strain (Accession No. KCTC 14106BP) exhibits excellent anti-obesity effect as a result of researching to develop a new strain with excellent anti-obesity effect, and thereby have completed the present invention.

Solution to Problem

An aspect of the present invention provides a *Lactobacillus fermentum* strain (Accession No. KCTC 14106BP).

Another aspect of the present invention provides a pharmaceutical composition for preventing or treating a metabolic disease including, as an active ingredient, a *Lactobacillus fermentum* strain (Accession No. KCTC 14106BP) or a culture thereof.

Yet another aspect of the present invention provides a food composition for preventing or inhibiting a metabolic disease including a *Lactobacillus fermentum* strain (Accession No. KCTC 14106BP) or a culture thereof.

Still another aspect of the present invention provides a feed composition for preventing or inhibiting a metabolic disease including a *Lactobacillus fermentum* strain (Accession No. KCTC 14106BP) or a culture thereof.

Yet still another aspect of the present invention provides a method of preventing and treating a metabolic disease including administering a *Lactobacillus fermentum* strain (Accession No. KCTC 14106BP) or a culture thereof to a subject.

Effect of the Invention

The present disclosure relates to a novel *Lactobacillus fermentum* strain (Accession No. KCTC 14106BP) and a composition for preventing or treating a metabolic disease including the same. The *Lactobacillus fermentum* according to the present invention may inhibit fat accumulation in white adipose tissue and increase anti-inflammatory cells. In addition, the *Lactobacillus fermentum* according to the present invention may effectively inhibit fat accumulation in brown adipose tissue and liver tissue. The *Lactobacillus fermentum* strain may exhibit excellent blood glucose improvement effect, and in particular, may reduce a fasting blood glucose level. The *Lactobacillus fermentum* strain may effectively ameliorate insulin resistance by improving glucose tolerance and increasing insulin sensitivity. Therefore, the *Lactobacillus fermentum* strain may be usefully used to prevent or treat a metabolic disease such as obesity.

BRIEF DESCRIPTION OF DRAWINGS

Exemplary embodiments can be understood in more detail from the following description taken in conjunction with the accompanying drawings, in which.

BEST MODE FOR CARRYING OUT THE INVENTION

An aspect of the present invention provides a *Lactobacillus fermentum* strain (Accession No. KCTC 14106BP).

*Lactobacillus* is an aerobic or facultative anaerobic, gram-positive *Bacillus* widely distributed in nature. Genus *Lactobacillus* includes *L. fermentum*, *L. sakei*, etc. The present inventors selected a novel *Lactobacillus fermentum* strain having excellent anti-obesity effect, and named it "*Lactobacillus fermentum* GB103." The strain was deposited with the Korea Collection for Type Cultures, Korea Research Institute of Bioscience and Biotechnology under the Accession No. SD1342 on Sep. 6, 2019. The same strain was deposited with the Korea Collection for Type Cultures, Korea Research Institute of Bioscience and Biotechnology under the Accession No. KCTC 14106BP on Jan. 14, 2020. In addition, the strain belongs to a probiotic strain, is harmless to the human body, and may be used without side effects.

As used herein, the term "*Lactobacillus fermentum* GB103" is interchangeably described as *L. fermentum* GB103 or *Lactobacillus fermentum* strain (Accession No. KCTC 14106BP).

Another aspect of the present invention provides a pharmaceutical composition for preventing or treating a metabolic disease including, as an active ingredient, a *Lactobacillus fermentum* strain (Accession No. KCTC 14106BP) or a culture thereof.

The *Lactobacillus fermentum* strain (Accession No. KCTC 14106BP) is the same as described above. In this case, the strain may be alive or dead, and alive strain is preferred. In addition, a culture of the strain may or may not contain the strain, and it is preferred to contain the strain.

The composition includes, based on the total weight of the composition, a therapeutically effective amount, or a nutritionally effective concentration of the active ingredient *Lactobacillus fermentum* strain (Accession No. KCTC 14106BP) or a culture thereof, wherein a content of $10^4$ to $10^{16}$ CFU/g, preferably $10^6$ to $10^{12}$ CFU/g is included, or a culture having an equivalent number of alive strains is included. In general, for an adult patient, $1 \times 10^6$ CFU/g or more of the alive strain, preferably $1 \times 10^8$ to $1 \times 10^{12}$ CFU/g of the alive strain may be administered once or divided in several times.

As used herein, the term "metabolic disease", also referred to as metabolic syndrome, is a disease assumed to be caused by insulin resistance and is a symptom having abnormality in two or more of cholesterol, blood pressure, and blood glucose levels. Metabolic syndrome is a conceptualization of the phenomenon that the risk factors of various cardiovascular diseases and type 2 diabetes are clustered together as one disease group, and encompasses insulin resistance and all of complex and various metabolic abnormalities and clinical features related to insulin resistance. Specifically, metabolic disease may be any one selected from the group consisting of obesity, hypertension, arteriosclerosis, hyperlipidemia, fatty liver, non-alcoholic fatty liver disease, hyperinsulinemia, diabetes, and insulin resistance syndrome.

As used herein, the term "obesity", also referred to as adipositas, is a disease in which excess body fat has accumulated abnormally. Irregular eating habits, excessive food intake, lack of physical activity, endocrine system diseases, genetic factors, psychological factors, medication, etc. can cause obesity. In addition, obesity increases the incidence of arteriosclerosis, cardiovascular diseases (stroke and ischemic cardiovascular diseases), hypertension, diabetes, hyperlipidemia, fatty liver, cholelithiasis, obstructive sleep apnea, menstrual irregularities, polycystic ovary diseases, infertility, decreased libido, depression, degenerative arthritis, gout, or the like. The obesity may be simple obesity, symptomatic obesity, childhood obesity, adult obesity, cell proliferative obesity, cell hypertrophic obesity, upper body obesity, lower body obesity, visceral fat obesity, or subcutaneous fat obesity.

As used herein, the term "hypertension" refers to a phenomenon in which perfusion blood pressure of blood flow through an artery increases. If the systolic blood pressure reaches 140 mmHg and the diastolic blood pressure reaches 90 mmHg or more, one may generally be diagnosed with hypertension. Hypertension has no noticeable symptoms, and there are primary (or essential) hypertension which does not have a known cause and secondary hypertension which is caused by renal disease, endocrine disease, pregnancy addiction, or the like. Most cases of hypertension (90 to 95%) are primary hypertension assumed to be caused by genetic causes combined with environmental factors such as obesity, stress, alcohol, and smoking.

As used herein, the term "arteriosclerosis" is defined as a phenomenon of narrowing the width of the arterial wall by loss of the elasticity of the walls of arteries, proliferation of abnormal tissue, and accumulation of fat inside the lining of the artery wall. Arteriosclerosis is a term that refers to a pathological change in an artery, and is named depending on the organs affected by arteriosclerosis. For example, arteriosclerosis includes, but is not limited to, cerebral infarction due to arteriosclerosis, and myocardial infarction due to coronary atherosclerosis.

As used herein, the term "hyperlipidemia" is a disease caused by large amount of lipids such as triglycerides and cholesterol in blood because lipid metabolism is not properly performed. Specifically, hyperlipidemia refers to a state in which lipid components such as triglycerides, LDL cholesterol, and free fatty acids in blood are increased. Hyperlipidemia includes, but is not limited to, hypercholesterolemia or hypertriglyceridemia.

As used herein, the term "fatty liver" is a state of excessive accumulation of fat in hepatocytes due to lipid metabolism disorder, and is defined as a case when fat reaches 5% or more of the liver weight. This causes various diseases such as angina pectoris, myocardial infarction, stroke, arteriosclerosis, fatty liver, pancreatitis, or the like. Fatty liver is divided into alcoholic fatty liver that is caused by alcohol consumption, and non-alcoholic fatty liver disease (NAFLD) that is not caused by alcohol.

As used herein, the term "non-alcoholic fatty liver disease" refers to a case when fatty liver is not caused by alcohol, and includes a series of process of liver damage ranging from simple steatosis in liver, non-alcoholic steatohepatitis (NASH) to hepatic cirrhosis. The causes of non-alcoholic fatty liver disease are side effects of drugs such as antiarrhythmic agents, antiviral agents, steroids, or cytotoxic agents, excessive calorie consumption such as carbohydrates, obesity, diabetes, and some genetic causes.

As used herein, the term "hyperinsulinemia" is a disease in which excessive amount of insulin is present in blood. Insulin is secreted by the pancreas and is a hormone that regulates blood glucose level and promotes the influx of glucose into muscle and other peripheral tissues. Therefore, hyperinsulinemia may occur due to disorder of the pancreas which is an insulin-secreting organ, and is most often caused by insulin resistance.

As used herein, the term "diabetes" is a chronic disease characterized by relative or absolute lack of insulin resulting in glucose-intolerance. The diabetes includes all types of diabetes, and may be, for example, type 1 diabetes, type 2 diabetes, and inherited diabetes, but is not limited thereto. Type 1 diabetes is insulin-dependent diabetes, mainly resulting from destruction of β-cells. As used herein, the term "type 2 diabetes" is insulin-independent diabetes, which is caused by insulin resistance. Type 2 diabetes is caused because increase in insulin is not detected in muscle and adipose tissue, or the action of insulin does not occur effectively even if it is detected.

As used herein, the term "insulin resistance" refers to a state in which cells do not respond to insulin which lower a blood glucose level, and thus cannot effectively burn glucose. When insulin resistance is high, the body thinks more insulin is needed and produces more insulin. This results in hyperinsulinemia, hypertension, or dyslipidemia, as well as heart disease and diabetes.

As used herein, the term "insulin resistance syndrome" is a generic term for the diseases caused by insulin resistance. This is characterized by cell resistance to insulin action, hyperinsulinemia and increased very low-density lipoprotein (VLDL) and triglyceride, and decreased high density lipoprotein (HDL), hypertension, etc., and is recognized as a risk factor for cardiovascular diseases and type 2 diabetes.

Figure 4:
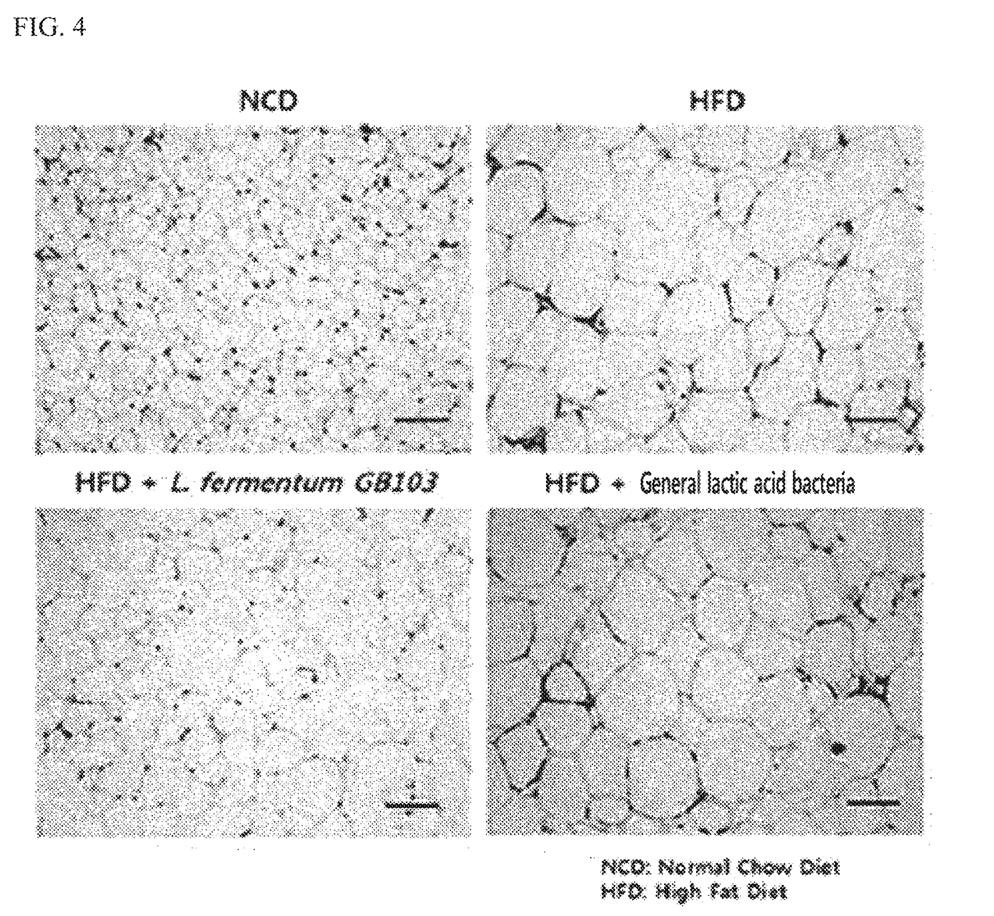
FIG. 4 is a view comparing the size of the adipocytes in white adipose tissue each from the mouse fed with normal chow diet, the mouse fed with high fat diet, the mouse fed with high fat diet and oral administration of general lactic acid bacteria, and the mouse fed with high fat diet and an oral administration of *L. fermentum* GB103 strain to compare.

According to an embodiment of the present invention, the strain may inhibit fat accumulation in white adipose tissue. Specifically, in an embodiment of the present invention, oral administration of the strain to the mouse model fed with high fat diet resulted in that the size of the adipocytes in white adipose tissue of the mouse model was significantly decreased. Meanwhile, when general lactic acid bacteria were orally administered to the mouse model fed with high fat diet, the size of the adipocytes in white adipose tissue of the mouse model was not decreased. Based on this, it was confirmed that the strain inhibits fat accumulation in white adipose tissue (FIG. 4).

According to an embodiment of the present invention, the strain may reduce meta-inflammation in white adipose tissue. As used herein, the term "meta-inflammation" is chronic and low-grade inflammation, which refers to an inflammatory response that occurs when excessive amount of nutrients or metabolites is provided. In particular, the chronic inflammatory response caused by obesity is known to play an important role in the process of increasing insulin resistance and developing metabolic abnormalities.

Figure 5:
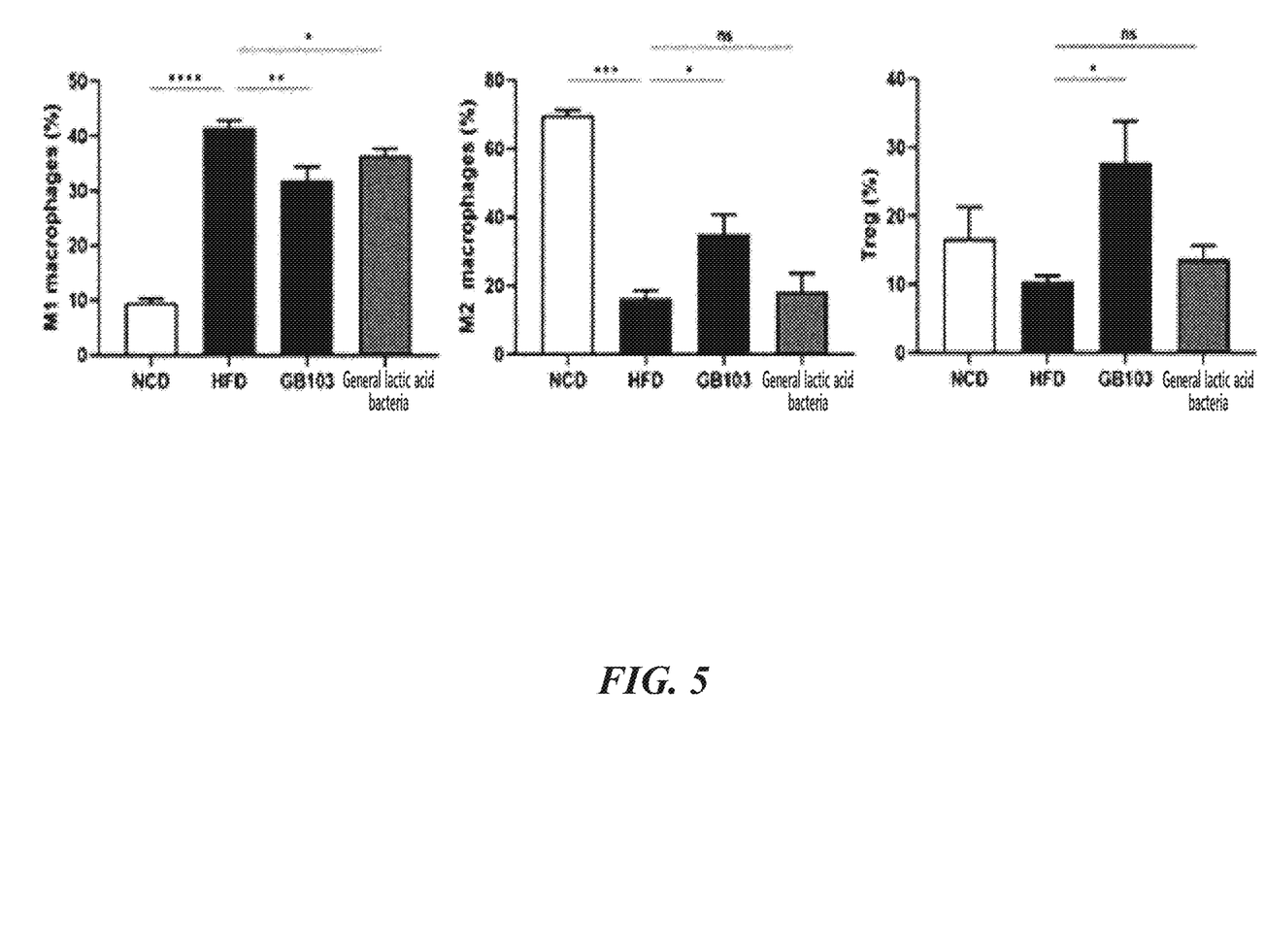
FIG. 5 is a graph comparing the number of M1 macrophages, M2 macrophages and regulatory T (Treg) cells in white adipose tissue of the mouse fed with normal chow diet, the mouse fed with high fat diet, the mouse fed with high fat diet and oral administration of general lactic acid bacteria, and the mouse fed with high fat diet and oral administration of a *L. fermentum* GB103 strain.

In an embodiment of the present invention, oral administration of the strain to the mouse model fed with high fat diet resulted in that M1 macrophages in white adipose tissue of the mouse model decreased, and M2 macrophages and Treg cells were significantly increased. Meanwhile, when general lactic acid bacteria were orally administered to the mouse model fed with high fat diet, M1 macrophages in white adipose tissue of the mouse model were significantly decreased, but M2 and Treg cells were not changed. Based on this, it was confirmed that the strain inhibits inflammatory response in white adipose tissue (FIG. 5).

Figure 6:
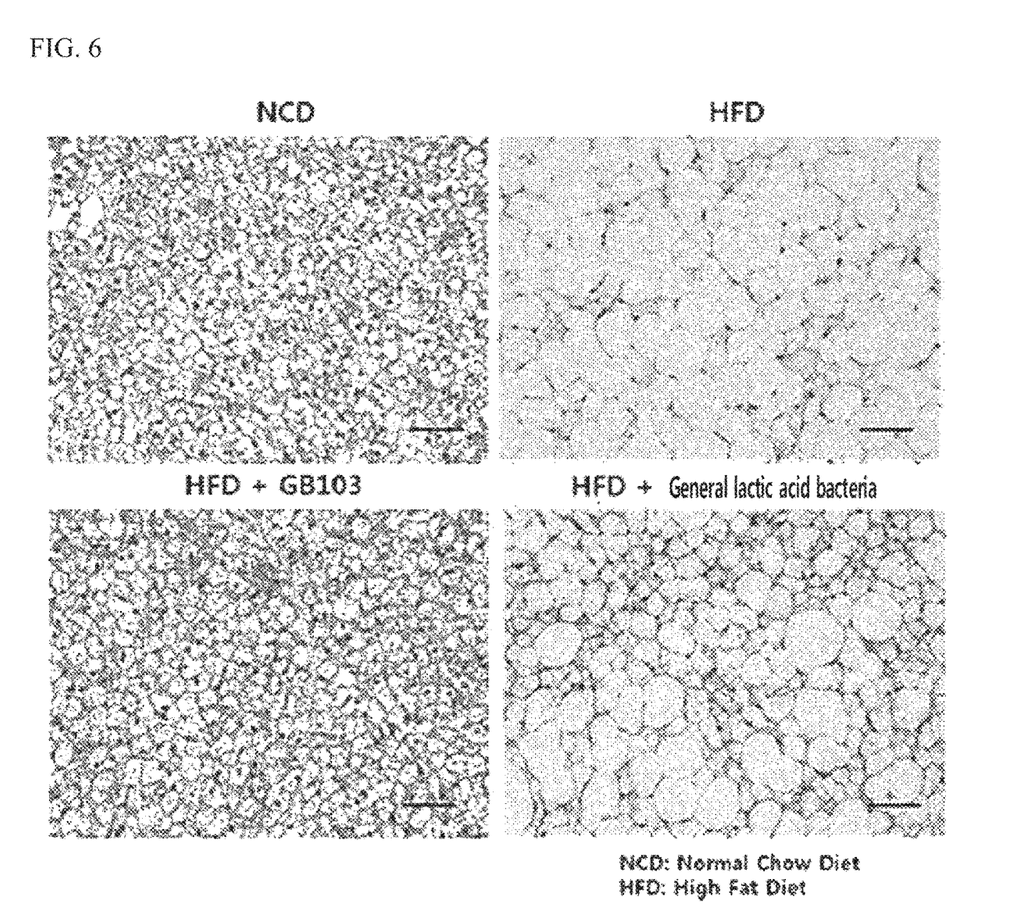
FIG. 6 is images comparing the size of the adipocytes in brown adipose tissue of the mouse fed with normal chow diet, the mouse fed with high fat diet, the mouse fed with high fat diet and oral administration of general lactic acid bacteria, and the mouse fed with high fat diet and oral administration of a *L. fermentum* GB103 strain.

According to an embodiment of the present invention, the strain may inhibit fat accumulation in brown adipose tissue. Specifically, in an embodiment of the present invention, oral administration of the strain to the mouse model fed with high fat diet resulted in that the size of the adipocytes in brown adipose tissue of the mouse model was significantly decreased. Meanwhile, when general lactic acid bacteria were orally administered to the mouse model fed with high fat diet, the size of the adipocytes in brown adipose tissue of the mouse model was not decreased. Based on this, it was confirmed that the strain inhibits fat accumulation in brown adipose tissue (FIG. 6).

Figure 7:
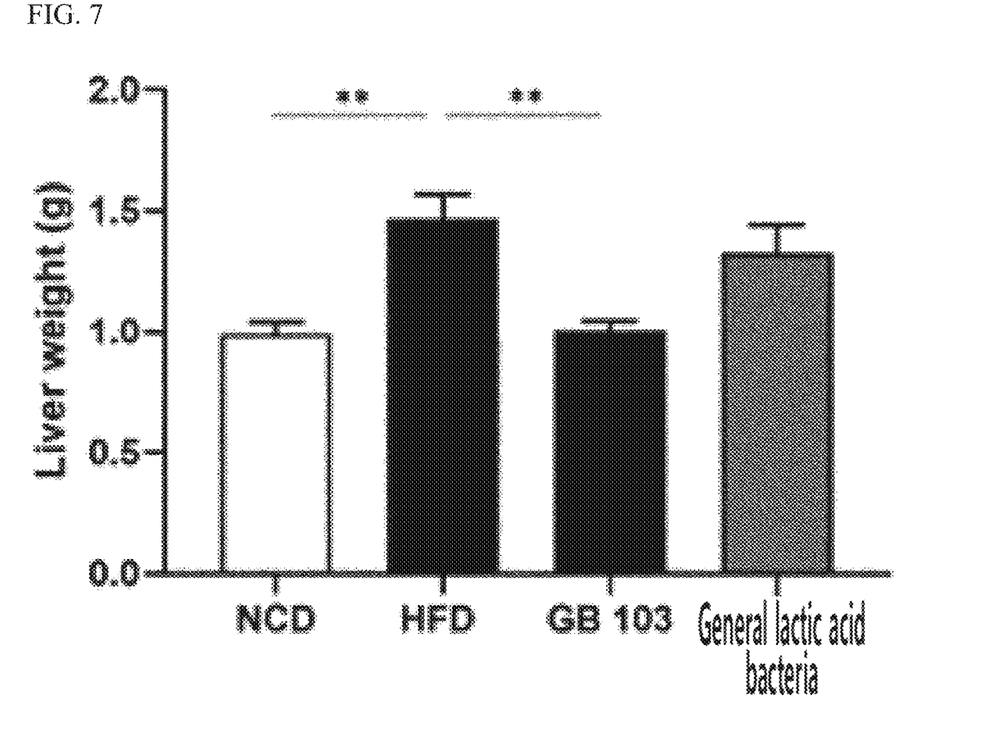
FIG. 7 is a graph comparing the liver weight of the mouse fed with normal chow diet, the mouse fed with high fat diet, the mouse fed with high fat diet and oral administration of general lactic acid bacteria, and the mouse fed with high fat diet and an oral administration of a *L. fermentum* GB103 strain.
Figure 8:
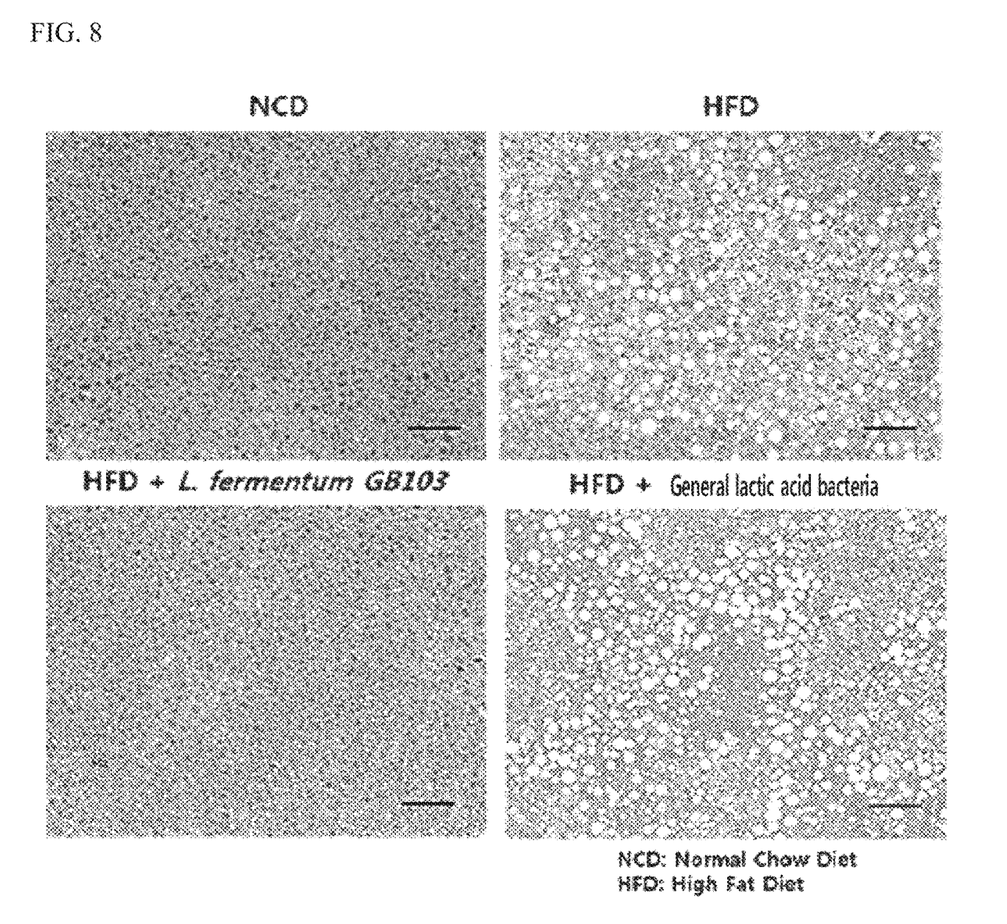
FIG. 8 is images comparing the degree of fat accumulation in liver tissue of the mouse fed with normal chow diet, the mouse fed with high fat diet, the mouse fed with high fat diet and oral administration of general lactic acid bacteria, and the mouse fed with high fat diet and an oral administration of a *L. fermentum* GB103.

According to an embodiment of the present invention, the strain may reduce liver weight and inhibit fat accumulation in liver tissue. Specifically, in an embodiment of the present invention, oral administration of the strain to the mouse model fed with high fat diet resulted in that the liver weight and fat accumulation in tissue of the mouse model were decreased. Meanwhile, when general lactic acid bacteria were orally administered to the mouse model fed with high fat diet, a lot of fat was accumulated in liver tissue of the mouse model and there was no change in liver weight as well. Based on this, it was confirmed that the strain reduces the liver weight and inhibits fat accumulation in tissue (FIGS. 7 and 8).

Figure 9:
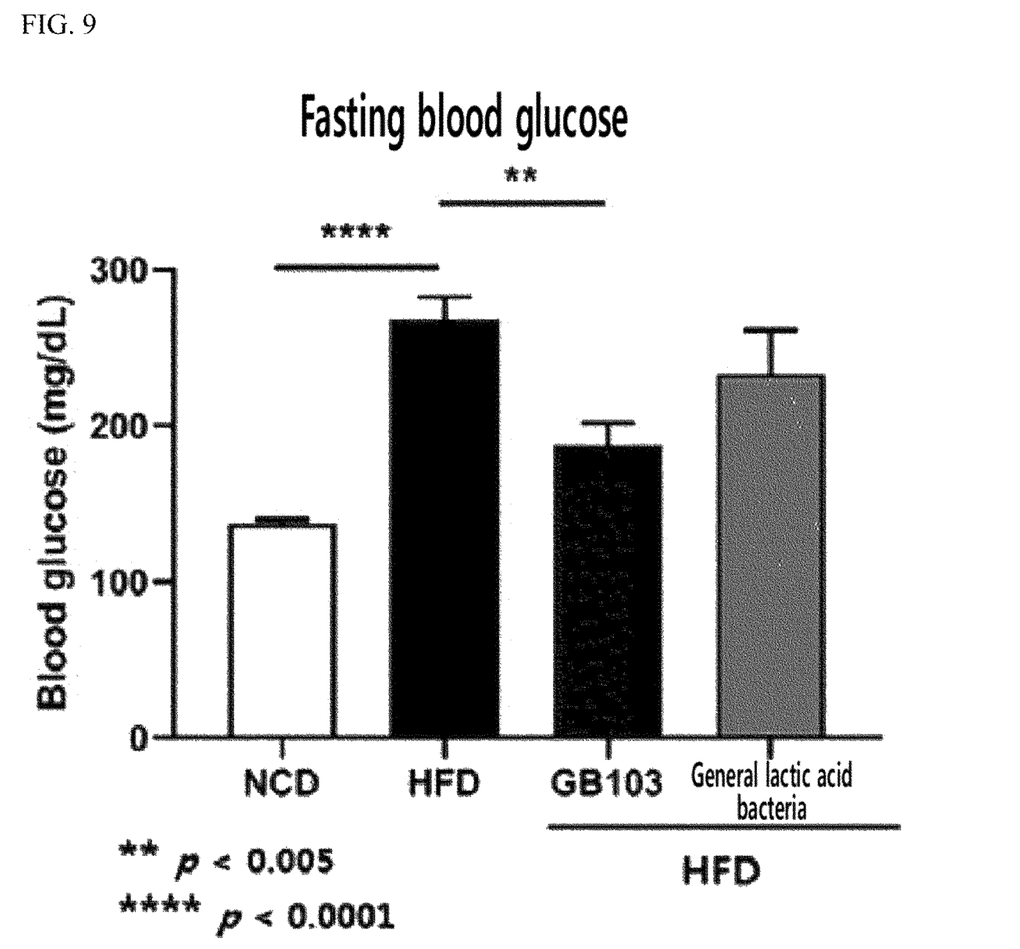
FIG. 9 is a graph comparing the fasting blood glucose level of the mouse fed with normal chow diet, the mouse fed with high fat diet, the mouse fed with high fat diet and oral administration of general lactic acid bacteria, and the mouse fed with high fat diet and an oral administration of a *L. fermentum* GB103 strain to confirm blood glucose lowering effect.
Figure 10:
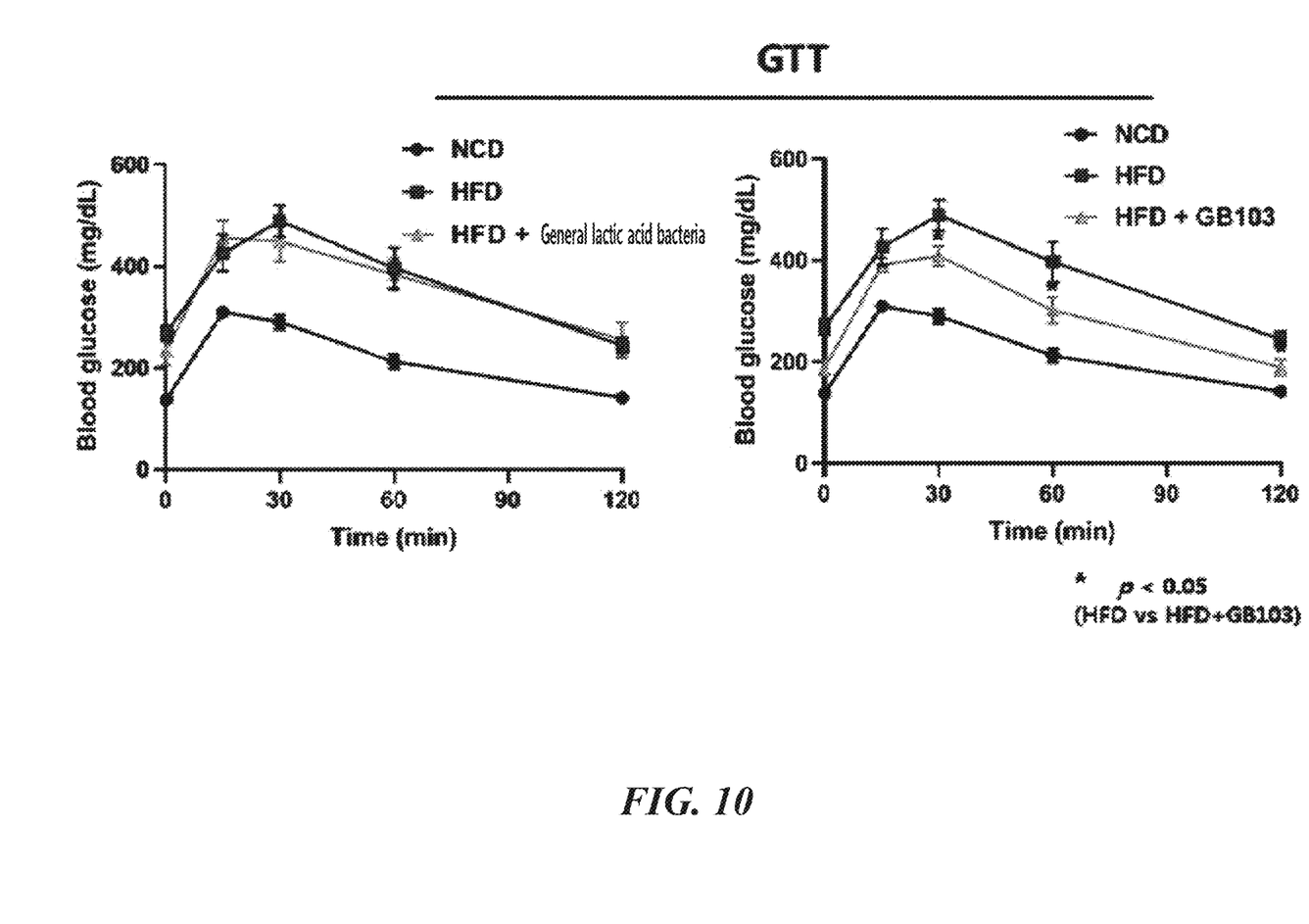
FIG. 10 is a graph comparing the blood glucose level after administration of glucose over time in the mouse fed with normal chow diet, the mouse fed with high fat diet, the mouse fed with high fat diet and oral administration of general lactic acid bacteria, and the mouse fed with high fat diet and an oral administration of a *L. fermentum* GB103 strain to confirm glucose tolerance ameliorating effect.

According to an embodiment of the present invention, the strain may reduce a blood glucose level. Preferably, the strain may reduce a fasting blood glucose level and improve glucose tolerance. Specifically, in an embodiment of the present invention, oral administration of the strain to the mouse model fed with high fat diet resulted in that a fasting blood glucose level and a blood glucose level after administration of glucose were decreased in the mouse model. Meanwhile, when general lactic acid bacteria were orally administered to the mouse model fed with high fat diet, a fasting blood glucose level and a blood glucose level after administration of glucose were not decreased. Based on this, it was confirmed that the strain reduces a fasting blood glucose level and improves glucose tolerance (FIGS. 9 and 10).

Figure 11:
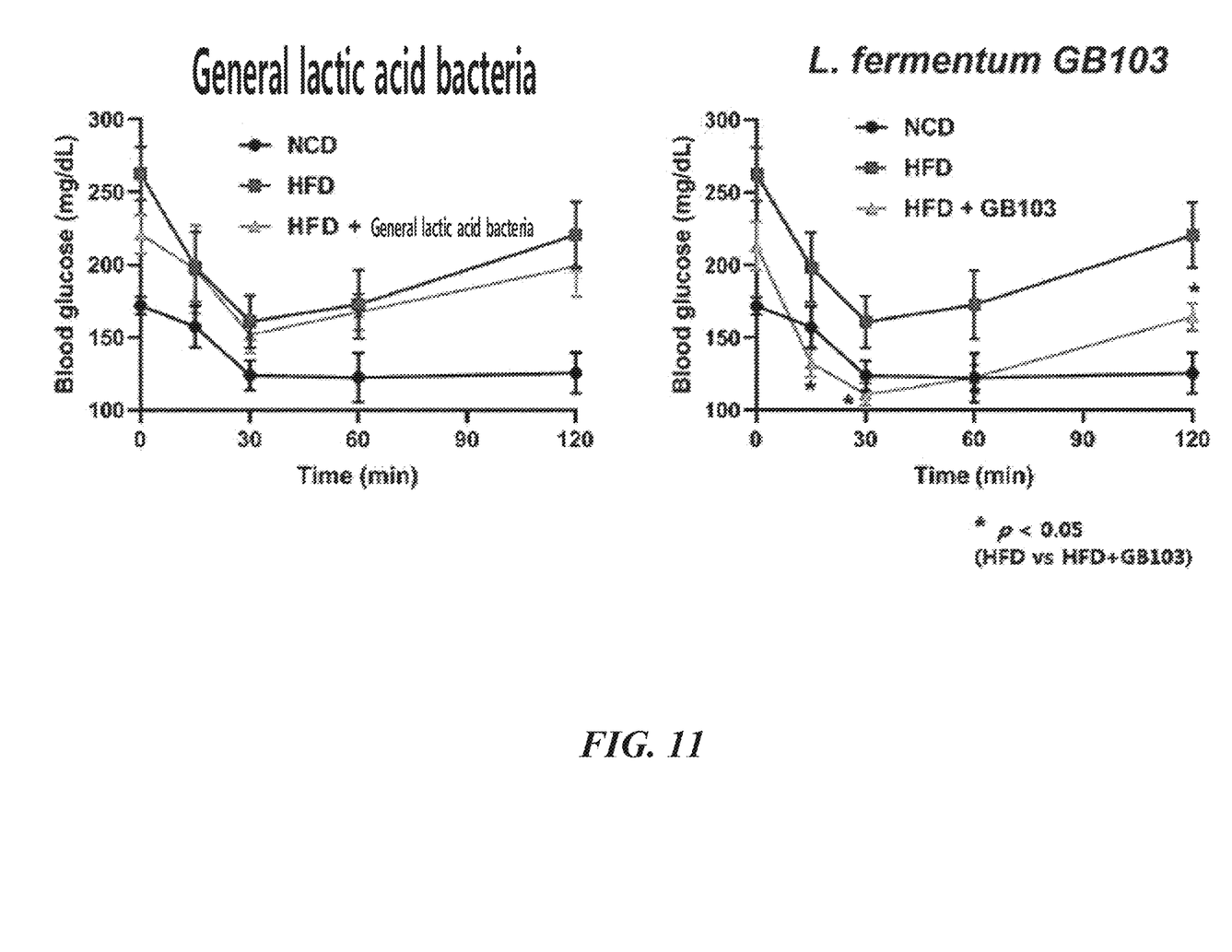
FIG. 11 is a graph comparing the blood glucose level after administration of insulin over time in the mouse fed with normal chow diet, the mouse fed with high fat diet, the mouse fed with high fat diet and oral administration of general lactic acid bacteria, and the mouse fed with high fat diet and an oral administration of a *L. fermentum* GB103 strain to confirm insulin resistance ameliorating effect.

According to an embodiment of the present invention, the strain may ameliorate insulin resistance. Specifically, in an embodiment of the present invention, when the strain was orally administered to the mouse model fed with high fat diet, the blood glucose level was significantly decreased in the mouse model after administration of insulin. Meanwhile, when general lactic acid bacteria were orally administered to the mouse model fed with high fat diet, the fasting blood glucose level and the blood glucose level after administration of insulin were not decreased. Based on this, it was confirmed that the strain ameliorates insulin resistance by increasing insulin sensitivity (FIG. 11).

The composition may further include a cryoprotectant or an excipient. Specifically, the cryoprotectant may be one or more selected from the group consisting of glycerol, trehalose, maltodextrin, skim milk powder, and starch. In addition, the excipient may be one or more selected from the group consisting of glucose, dextrin, and skim milk powder.

The composition may include, based on the total weight of the composition, 0.01 wt % to 20 wt % or 0.01 wt % to 10 wt % of the cryoprotectant, and specifically, the composition may include, 5 wt % to 20 wt % of the glycerol, 2 wt % to 10 wt % of the trehalose, 2 wt % to 10 wt % of the maltodextrin, 0.5 wt % to 2 wt % of the skim milk powder, and 0.1 wt % to 1 wt % of the starch. In addition, the composition may include, based on the total weight of the composition, 75 wt % to 95 wt % or 85 wt % to 95 wt % of the excipient.

Yet another aspect of the present invention provides a food composition for preventing or inhibiting a metabolic disease including a *Lactobacillus fermentum* strain (Accession No. KCTC 14106BP) or a culture thereof.

The *Lactobacillus fermentum* strain (Accession No. KCTC 14106BP) is the same as described above.

In this case, a metabolic disease is as described above, and in particular, the strain may be a food composition for preventing or inhibiting obesity.

The food composition includes all forms such as functional food, nutritional supplement, health food, and food additives, and the types of food composition may be prepared in various forms according to a conventional method known in the art.

When the strain is used as a food additive, the strain may be added as it is or may be used with other food or food ingredients, and may be appropriately used according to a conventional method. The mix amount of the active ingredient may be appropriately determined depending on the purpose of use (prevention, health, or therapeutic treatment).

In general, when prepare food or beverage, the active ingredient may be added in an amount of 0.0001 wt % to 1 wt %, specifically 0.001 wt % to 0.1 wt % in the raw material composition containing the strain. However, in the case of long-term intake for health and hygiene or health control purposes, the amount may be below the above range.

Yet another aspect of the present invention provides a feed composition for preventing or inhibiting a metabolic disease including a *Lactobacillus fermentum* strain (Accession No. KCTC 14106BP) or a culture thereof.

The *Lactobacillus fermentum* strain (Accession No. KCTC 14106BP) is the same as described above.

The feed composition for preventing or ameliorating a metabolic disease may be prepared by adding a *Lactobacillus fermentum* strain (Accession No. KCTC 14106BP) in an appropriate effective concentration range according to various methods for preparing a feed composition known in the art.

Yet still another aspect of the present invention provides a method of preventing and treating a metabolic disease including administering a *Lactobacillus fermentum* strain (Accession No. KCTC 14106BP) or a culture thereof to a subject.

The subject may have a metabolic disease. In addition, the subject may be a mammal, preferably a human. In this case, the *Lactobacillus fermentum* strain (Accession No. KCTC 14106BP) is the same as described above. In addition, the route of administration, dosage, and frequency of administration of the strain or a culture thereof may be administered to a subject in various ways and amounts depending on the condition of a patient, and the presence or absence of side effects, and optimal method of administration, dosage and frequency of administration may be appropriately selected within an appropriate range by a person skilled in the art. In addition, the types of metabolic diseases are as described above.

Yet another aspect of the present invention provides a use of a *Lactobacillus fermentum* strain (Accession No. KCTC 14106BP) or a culture thereof to treat a metabolic disease.

In this case, the *Lactobacillus fermentum* strain (Accession No. KCTC 14106BP) is the same as described above. In addition, the types of metabolic disease are as described above.

MODE FOR CARRYING OUT THE INVENTION

Hereinafter, the present invention will be described in more detail by way of the following examples. However, the following examples are only for illustrating the present invention, and the scope of the present invention is not limited thereto.

Example 1. Screening for a Strain Having Anti-Obesity Effect

Lactic acid bacteria having anti-obesity efficacy among 16 lactic acid bacteria purchased from Mediogen Co., were selected using a mouse model. Specifically, C57BL/6 mice which were fed with 60% high fat diet (HFD), and then administered orally with the respective lactic acid bacteria, were used as an experimental group. Mice only fed with 60% high fat diet were used as a control group. In this case, each of lactic acid bacteria was orally administered at $5 \times 10^9$ CFU per mouse daily. The anti-obesity effect was determined based on the body weight differences between the experiment group and the control group.

Figure 1:
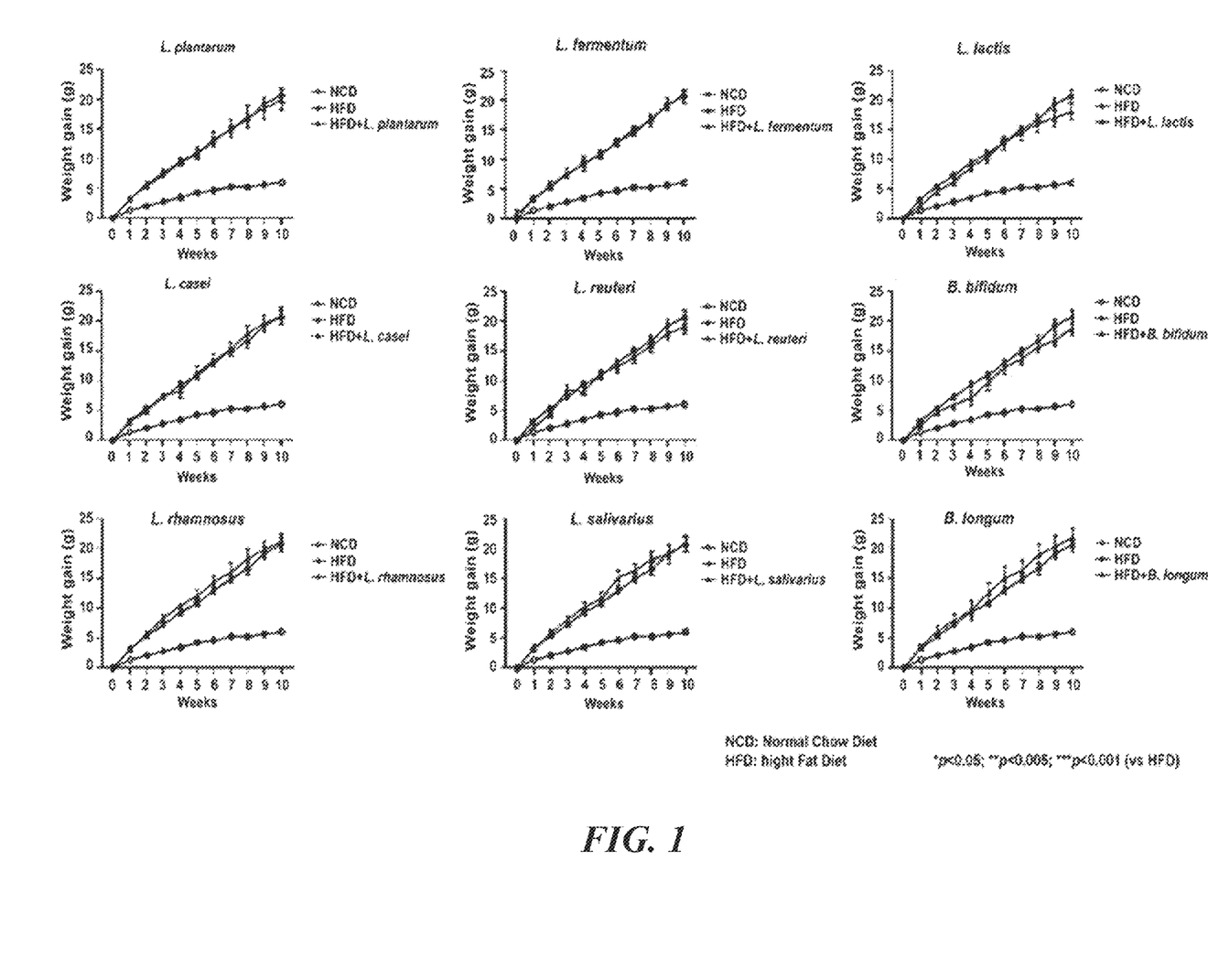
FIGS. 1 to 3 are graphs showing the body weight of the mice fed with high fat diet after oral administration of 16 strains of lactic acid bacteria, respectively, compared to the mice only fed with high fat diet.
Figure 2:
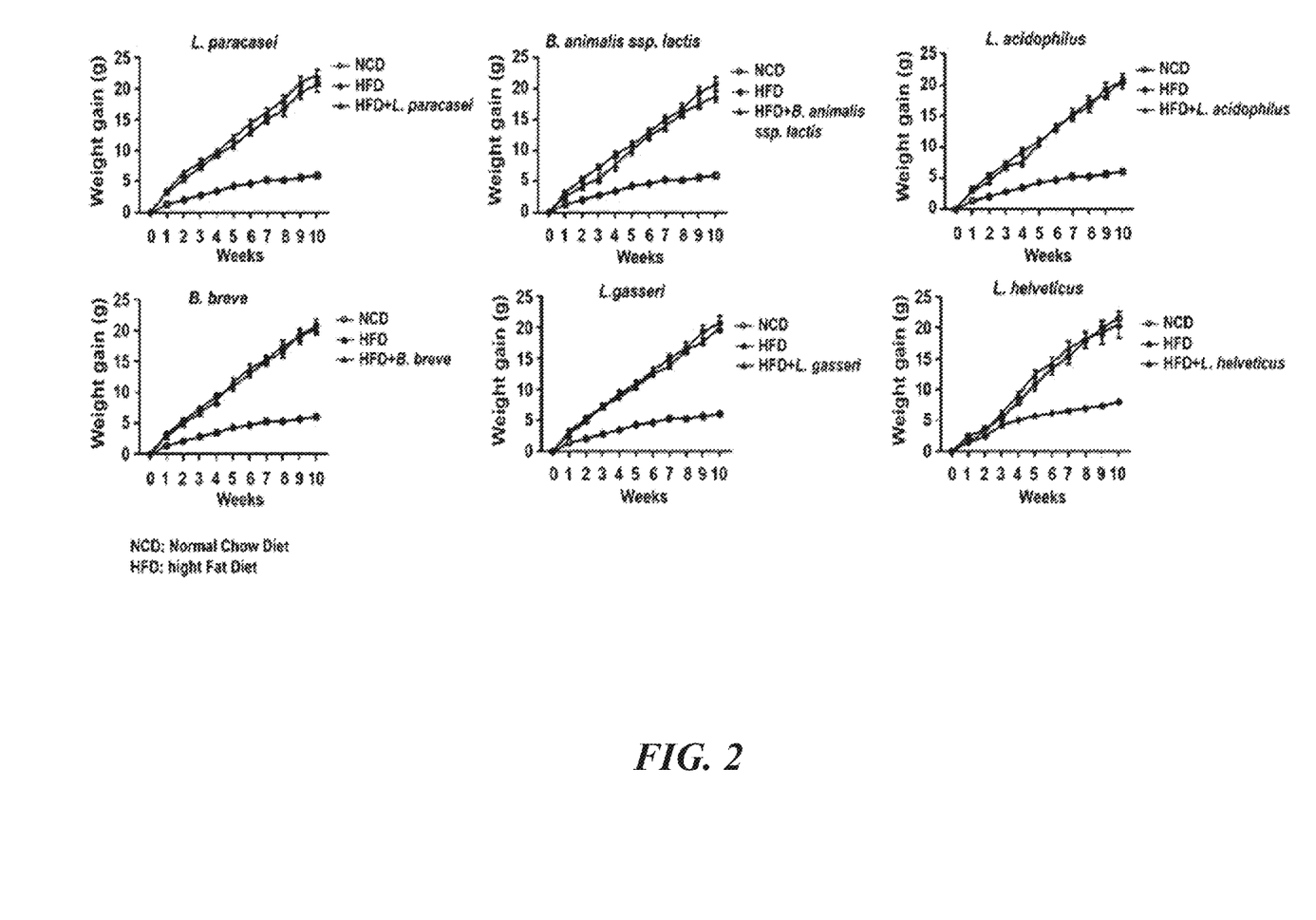
Figure 3:
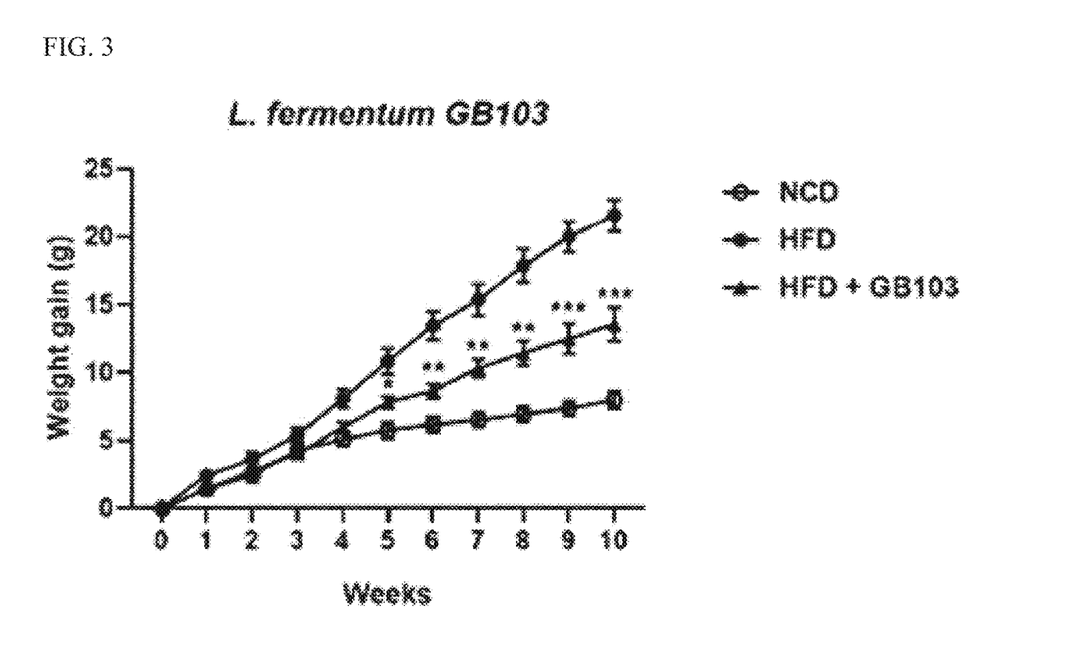

As a result, the *Lactobacillus fermentum* GB103 strain most effectively inhibited body weight gain. In this case, there were some of *L. fermentum* lactic acid bacteria that did not exhibit anti-obesity effect (FIGS. 1 to 3). Based on this, it was confirmed that the *Lactobacillus fermentum* GB103 strain exhibited anti-obesity effect among *L. fermentum* lactic acid bacteria.

Example 2. Confirmation of Fat Accumulation Inhibitory Effect of *L. fermentum* GB103 Strain in White Adipose Tissue Using a mouse model, fat accumulation inhibitory effect of a *L. fermentum* GB103 (Accession No. KCTC 14106BP) strain in white adipose tissue was confirmed. Specifically, C57BL/6 mice which were fed with 60% high fat diet (HFD), and then administered orally with the *L. fermentum* GB103 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or a *L. fermentum* GB103 strain was orally administered daily at $5 \times 10^9$ CFU per mouse.

After the administration of each test substance was completed, white adipose tissue was separated by autopsy. The separated white adipose tissue was fixed with 10% neutral buffered formalin. Then, paraffin sections were prepared, stained with Hematoxylin & Eosin (H&E), and then the size of the cells was observed.

The result showed that the size of the adipocytes in the negative and positive control groups fed with high fat diet was increased compared to the normal group, while the size of the adipocytes in the experimental group to which a *L. fermentum* GB103 strain was orally administered was significantly decreased (FIG. 4). Based on this, it was confirmed that the *L. fermentum* GB103 strain effectively inhibits fat accumulation in white adipose tissue.

Example 3. Confirmation of Immune Cell Regulatory Effect of *L. fermentum* GB103 Strain in White Adipose Tissue Using a mouse model, changes of immune cells caused by administration of a *L. fermentum* GB103 strain in white adipose tissue were confirmed. Specifically, C57BL/6 mice which were fed with 60% (HFD), and then administered orally with a *L. fermentum* GB102 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or a *L. fermentum* GB103 strain was orally administered daily at $5 \times 10^9$ CFU per mouse.

After the administration of each test substance was completed, immune cells were separated from epididymal white adipocyte tissue of mice in each group by autopsy, stained the cells with specific antibodies, and then analyzed by flow cytometry. The adipose tissue was finely cut with curved scissors, incubated with 2 mg/mL collagen Type II (Worthington) for 45 minutes at 37° C., and then stromal vascular fraction (SVF) was isolated by a centrifugation. After washed with FACS buffer and then blocked at 4° C. for 10 minutes to inhibit non-specific binding, anti-MHCII CA, USA), anti-F4/80 (Biolegend, CA, USA), anti-CD206 (Biolegend, CA, USA), anti-CD11c (Biolegend, CA, USA), and anti-CD11b (Biolegend, CA, USA) antibodies were added to M1/M2 macrophages, and allowed to react at 4° C. for 30 minutes, followed by washing with FACS buffer. Treg cells were subjected to the same procedure as above using anti-TCRβ (Biolegend, CA, USA) and anti-CD4 (Biolegend, CA, USA) antibodies, and then treated with eBioscience™ Foxp3/Transcription Factor Staining Buffer for fixation and increase of permeability to stain with an anti-Foxp3 antibody (eBioscience, CA, USA). Among MHCII+F4/80+ macrophages, CD11b+CD206+ cells were analyzed with M2 macrophages, and CD11b+CD11c+ cells were analyzed with M1 macrophages. Treg cells were analyzed with TCRβ+CD4+Foxp3+ cells.

The result showed that an amount of the inflammatory M1 macrophages in the negative and positive control group mice fed with high fat diet were higher than that of the normal group, while an amount of the M1 macrophages in the experimental group mice to which the *L. fermentum* GB103 strain was orally administered were significantly lower than that of the negative control group. It was also confirmed that an amount of the anti-inflammatory M2 macrophages and Treg cells in the negative and positive control group mice fed with high fat diet were lower than that of the normal group, while an amount of the M2 macrophages and Treg cells in the experimental group mice to which the *L. fermentum* GB103 strain was administered orally were significantly increased compared to the negative control group. Based on this, immune cell regulatory effect of the *L. fermentum* GB103 strain in white adipose tissue was confirmed (FIG. 5).

Example 4. Confirmation of Fat Accumulation Inhibitory Effect of *L. fermentum* GB103 Strain in Brown Adipose Tissue Using a mouse model, fat accumulation inhibitory effect of a *L. fermentum* GB103 strain in brown adipose tissue was confirmed. Specifically, C57BL/6 mice which were fed with 60% (HFD), and then administered orally with a *L. fermentum* GB103 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or a *L. fermentum* GB103 strain was orally administered daily at $5 \times 10^9$ CFU per mouse.

After the administration of each test substance was completed, brown adipose tissue was separated from the mice in each group by autopsy. The separated brown adipose tissue was fixed with 10% neutral buffered formalin. Then, paraffin sections were prepared, stained with H&E, and then the size of the cells was observed.

The result showed that the size of the adipocytes in the negative and positive control groups mice fed with high fat diet was increased compared to the normal group, while the size of the adipocytes in the experimental group to which the *L. fermentum* GB103 strain was administered orally was significantly decreased (FIG. 6). Based on this, it was confirmed that the *L. fermentum* GB103 strain effectively inhibits fat accumulation in brown adipose tissue.

Example 5. Confirmation of Fat Accumulation Inhibitory Effect of *L. fermentum* GB103 Strain in Liver Tissue Using a mouse model, fat accumulation inhibitory effect of a *L. fermentum* GB103 strain in liver tissue was confirmed. Specifically, C57BL/6 mice which were fed with 60% (HFD), and then administered orally with a *L. fermentum* GB103 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or a *L. fermentum* GB103 strain was orally administered daily at $5 \times 10^9$ CFU per mouse.

After the administration of each test substance was completed, the liver was extracted by autopsy, and the liver weight was measured to compare and evaluate the liver weight between groups. After the extracted liver was fixed with 10% buffered formalin, paraffin sections were prepared, stained with H&E, and then the size of the cells was observed.

The result showed that the liver weight of the negative and positive control group mice fed with high fat diet were increased compared to the normal group, while the liver weight in the experimental group mice to which the *L. fermentum* GB103 strain was administered orally were significantly decreased compared to the negative control group (FIG. 7). Furthermore, compared to the normal group, fat accumulation in liver tissue was increased in the negative and positive control group mice fed with high fat diet. However, little fat was accumulated in liver tissue of the experimental group mice to which the *L. fermentum* GB103 strain administered orally, and fat accumulation level was similar to that of the negative control group (FIG. 8). Based on this, it was confirmed that the *L. fermentum* GB103 strain effectively inhibits the liver weight and fat accumulation in liver tissue.

Example 6. Confirmation of Fasting Blood Glucose-Lowering and Glucose Tolerance Improvement Effects of *L. fermentum* GB103 Strain Glucose tolerance test (GTT) was performed to confirm glucose tolerance improvement effect of a *L. fermentum* GB103 strain. First, C57BL/6 mice which were fed with 60% (HFD), and then administered orally with a *L. fermentum* GB103 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or a *L. fermentum* GB103 strain was orally administered daily at $5 \times 10^9$ CFU per mouse.

To perform glucose tolerance test, mice were fasted for 16 hours or more, and then a glucose solution was injected intraperitoneally at a dose of 1 g/kg. Then, blood was collected from the tail vein of the mice after 0, 30, 60, 90, and 120 minutes, and blood glucose was measured using a blood glucose meter. In this case, blood glucose at 0 minutes refers to fasting blood glucose.

The result showed that the fasting blood glucose level was significantly increased in the negative and positive control group mice fed with high fat diet, compared to the normal group. Meanwhile, the fasting blood glucose level of the experimental group mice to which the *L. fermentum* GB103 strain was administered orally was significantly decreased compared to the negative control group (FIG. 9).

In addition, it was confirmed that the blood glucose level after administration of glucose in the negative and positive control group mice fed with high fat diet was higher than that of the normal group, while the blood glucose level of the experimental group mice to which the *L. fermentum* GB103 strain was administered orally was significantly reduced compared to the negative control group (FIG. 10). Based on this, it was confirmed that the *L. fermentum* GB103 strain exhibits fasting blood glucose-lowering and glucose tolerance improvement effects.

Example 7. Confirmation of Insulin Resistance Ameliorating Effect of *L. fermentum* GB103 Strain Insulin tolerance test (ITT) was performed to confirm insulin resistance ameliorating effect of a *L. fermentum* GB103 strain. First, C57BL/6 mice which were fed with a 60% (HFD), and then administered orally with a *L. fermentum* GB103 strain, were used as an experimental group. In addition, mice fed only with 60% high fat diet were used as a negative control group, and mice fed with 60% high fat diet and oral administration of general lactic acid bacteria (*L. plantarum* MG5120) were used as a positive control group. Furthermore, mice fed with normal chow diet (NCD) were used as a normal group. In this case, general lactic acid bacteria purchased from Mediogen Co., or *L. fermentum* GB103 strain was orally administered daily at $5 \times 10^9$ CFU per mouse.

To perform insulin tolerance test, mice were fasted for 4.5 hours, and then an insulin solution was administered intraperitoneally at a dose of 1 U/kg. Blood was collected from the tail vein of the mice after 0, 30, 60, 90 and 120 minutes, and then blood glucose was measured with a blood glucose meter.

The result confirmed that the blood glucose level after administration of insulin in the negative and positive control group mice fed with high fat diet was higher than that of the normal group, while the blood glucose level of the experimental group mice to which the *L. fermentum* GB103 strain was administered orally was significantly decreased compared to the negative control group (FIG. 11). Based on this, it was confirmed that the *L. fermentum* GB103 strain effectively ameliorates insulin resistance by increasing insulin sensitivity.

<Accession Number>
Name of Depository: Korean Collection for Type Cultures (KCTC), Korea Research Institute of Bioscience and Biotechnology
Accession Number: KCTC14106BP
Date of Deposit: 20200114

What is claimed is:

1. A method of preventing or treating a metabolic disease in a subject comprising:
   administering a *Lactobacillus fermentum* strain (Accession No. KCTC 14106BP) the subject.

2. The method of claim 1, wherein the metabolic disease is any one selected from a group consisting of obesity, hypertension, arteriosclerosis, hyperlipidemia, fatty liver, non-alcoholic fatty liver disease, hyperinsulinemia, diabetes, and insulin resistance syndrome.

3. The method of claim 1, wherein the strain inhibits fat accumulation in white adipose tissue.

4. The method of claim 1, wherein the strain reduces metabolic inflammation in white adipose tissue.

5. The method of claim 1, wherein the strain inhibits fat accumulation in brown adipose tissue.

6. The method of claim 1, wherein the strain inhibits fat accumulation in liver tissue.

7. The method of claim 1, wherein the strain reduces a blood glucose level.

8. The method of claim 1, wherein the strain reduces insulin resistance.

9. The method of claim 1, wherein the *Lactobacillus fermentum* strain (Accession No. KCTC 14106BP) is comprised in a food composition.

10. The method of claim 1, wherein the *Lactobacillus fermentum* strain (Accession No. KCTC 14106BP) is comprised in a feed composition.

\* \* \* \* \*